United States Patent

[11] 3,569,837

[72] Inventor Aleksander Makiedonski
64 bl.4 m.2, Swierczewskiego, Michalin, Warsaw, Poland

[21] Appl. No. 843,002
[22] Filed July 18, 1969
[45] Patented Mar. 9, 1971
[32] Priority Oct. 14, 1965
[33] Poland
[31] P111,209
Continuation-in-part of application Ser. No. 586,095, Oct. 12, 1966, now abandoned.

[54] SYSTEM FOR SUPPRESSING ONE SIDEBAND IN AMPLITUDE-MODULATED TRANSMITTER
6 Claims, 7 Drawing Figs.

[52] U.S. Cl. ........ 325/137
[51] Int. Cl. ........ H04b 1/68
[50] Field of Search ........ 179/15 (SSB); 325/50; 325/137

[56] References Cited

UNITED STATES PATENTS

| | | | |
|---|---|---|---|
| 2,761,105 | 8/1956 | Crosby | 325/137 |
| 2,793,349 | 5/1957 | Crosby | 325/137 |
| 2,987,683 | 6/1961 | Powers | 325/137 |
| 3,212,008 | 10/1965 | Kahn | 325/137 |

*Primary Examiner*—Robert L. Griffin
*Assistant Examiner*—Albert J. Mayer
*Attorney*—Waters, Roditi, Schwartz & Nissen

ABSTRACT: A system for suppressing one sideband in a radio transmitter having amplitude and phase modulation. The system comprises an integrator circuit receiving the signal to be transmitted from an amplitude-modulator amplifier output through a compensated voltage divider, the output of said amplifier being also applied to a delay line the output of which is coupled to a modulation stage of the transmitter. Input terminals of a high-frequency preamplifier of said transmitter are coupled to output terminals of a phase modulator of said transmitter through an automatic delay control circuit.

SYSTEM FOR SUPPRESSING ONE SIDEBAND IN AMPLITUDE-MODULATED TRANSMITTER

OTHER APPLICATIONS

This is a continuation-in-part of my earlier filed and abandoned application, Ser. No. 586,095 filed Oct. 12, 1966.

DRAWING

Figure 2:
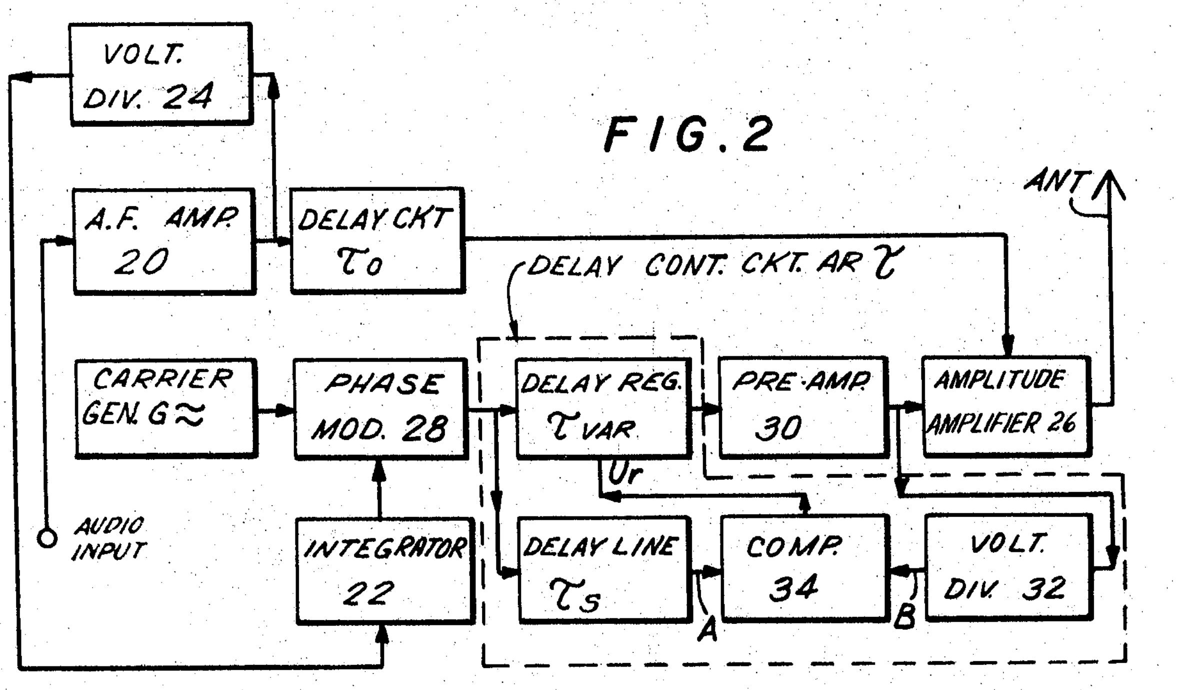
FIG. 2 shows, also in block diagram form, a sideband suppression system according to the invention.
Figure 3:
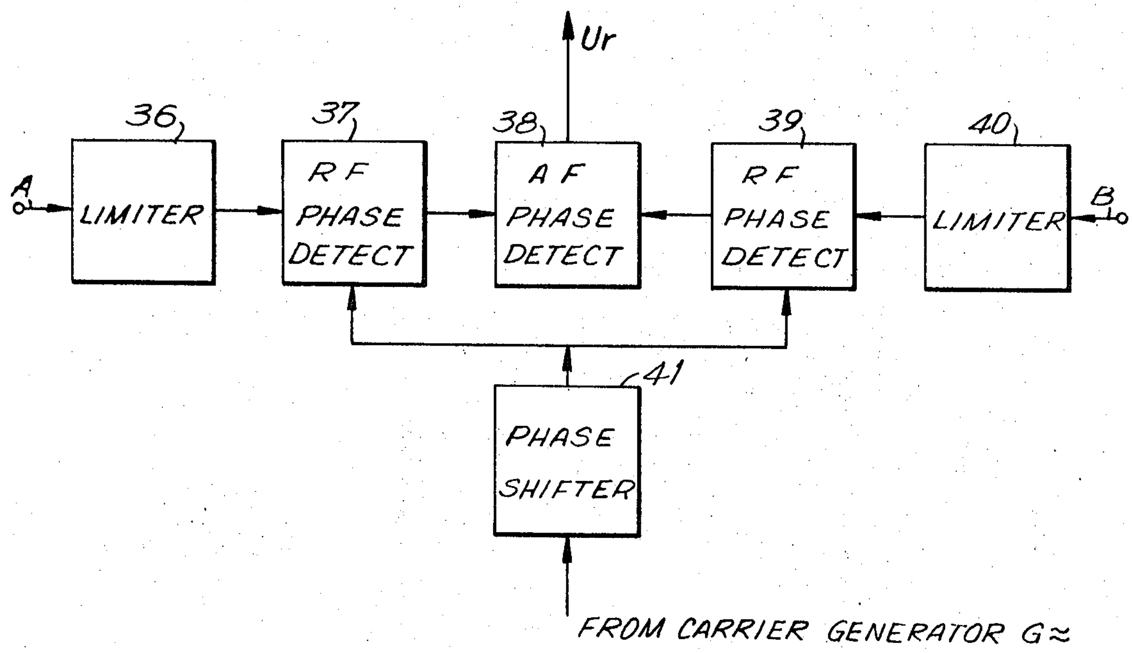
Figure 4:
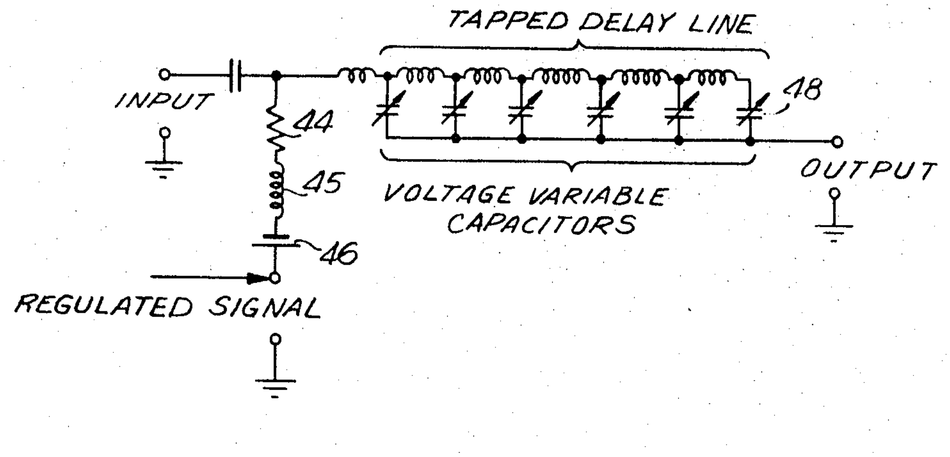
Figure 5:
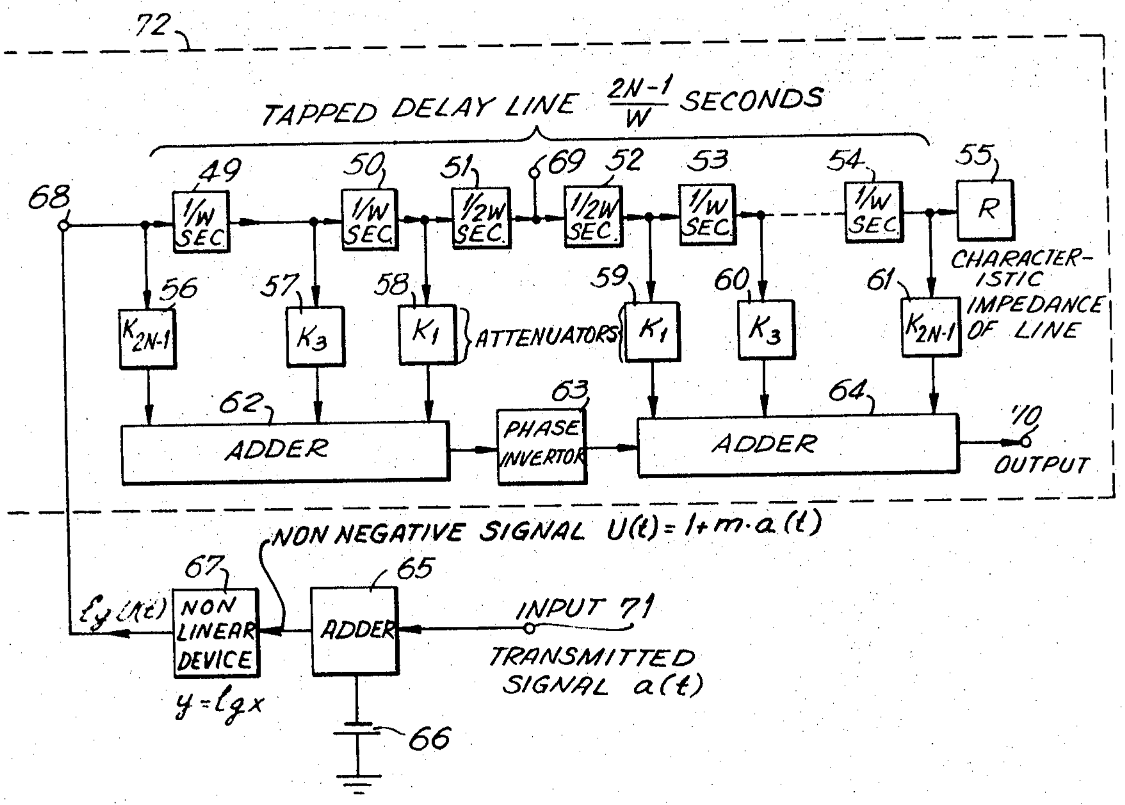
Figure 6:
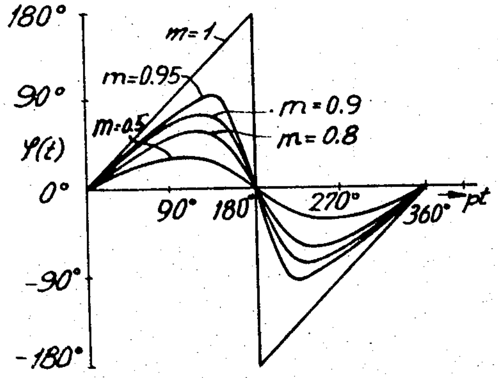
Figure 7:
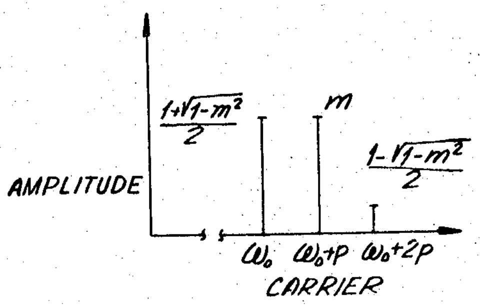

FIGS. 3, 4 and 5 further illustrate components of the system of FIG. 2; and FIGS. 6 and 7 are signal charts for the system of FIG. 2.

DETAILED DESCRIPTION

This invention relates to a system for the suppression of one sideband in the emission spectrum of amplitude-modulated broadcast transmitters, which system provides simultaneously direct phase modulation of the carrier wave thus developing modulated signals of the frequency spectrum distrituted on one side of the carrier wave frequency, the envelope of these signals being slightly distorted, due to which the information transmitted in the modulated signals can be received, with good quality, by receiver's, for example, of the broadcast type, intended for the reception of double-sideband signals emitted by conventional amplitude-modulated transmitters.

Figure 1:
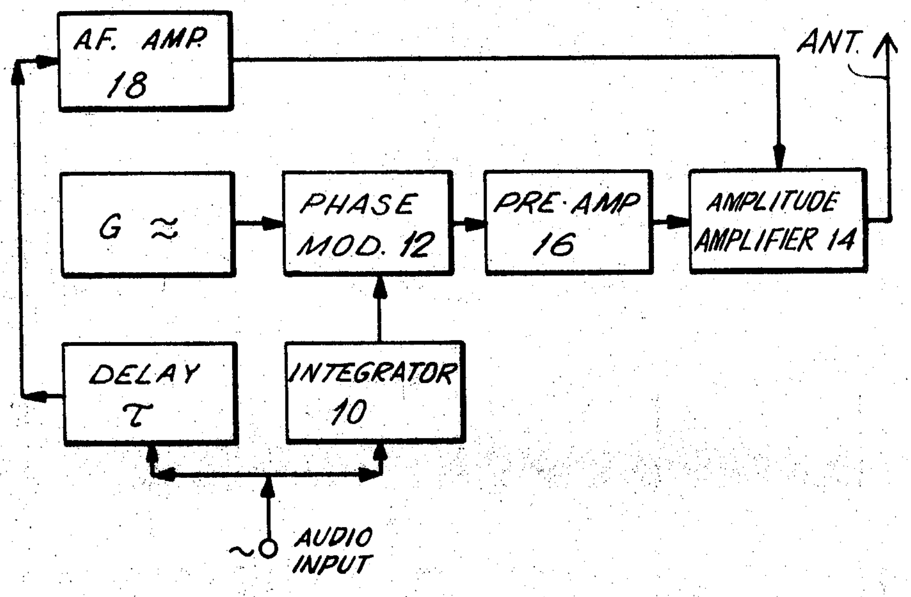
FIG. 1 PRIOR ART
FIG. 1 shows the block diagram of a sideband suppression system according to the prior art.

One of the systems previously used to suppress the unwanted sideband in the output signals of amplitude-modulated transmitters, with simultaneous provision of direct modulation of carrier wave phase, is shown in FIG. 1. Such a system is described by E. Kettel in "Telefunken Zeitung" part 3/4, pages 247—259, 1964.

The suppression of the unwanted sideband is achieved by means of an additional phase modulation of the transmitter carrier wave. This phase modulation employs a signal, the voltage ($t$) of which is related to the voltage $U$ ($t$) of the signal which results in the carrier wave amplitude modulation according to the following relationship:

$$\varphi(t)=-\frac{1}{\pi}\int_{-\infty}^{+\infty}\frac{\log_e U(t+x)}{x}dx$$

The above relationship can be obtained by converting the formulae (2) and (14) in the above-mentioned work by E. Kettel.

The signal ($t$) is obtained by means of a special analogue computer including an integrator 10.

As occurs in practical integrator arrangements, in a wideband 90° phase filter which can be based on the circuit described by K. H. Powers in U.S. Pat. No. 3,050,700, an additional time delay $\tau int$ of the signal ($t$) arises in relation to the signal $U$ ($t$). A delay element $\tau$ is inserted into the carrier amplitude-modulation channel. This delay element introduces a time delay to the signal, the delay value being equal to the difference between the following two delays: one which is the total time delay of the signal introduced by the integrator 10 and that part of the transmitter high-frequency channel which is comprised between the output terminals of a phase modulator 12 and the input terminals of an amplitude amplifier 14, which part is the preamplifier 16; a second delay which is that introduced by the amplifier 18 of an amplitude modulator.

FIG. 1 does not show those elements of the transmission chain which are connected between a microphone amplifier and the input terminals of an audiofrequency line AF, because these elements do not partake in the shaping process of the single-sideband signal since they are connected before that point of the system at which a low-frequency signal is separated into two channels, i.e.: the amplitude-modulation channel and the phase modulation channel.

The application of the system shown in FIG. 1 to the suppression of one sideband in actual transmitters, especially in high-power ones, will not ensure a complete suppression of the unwanted sideband, even in the case of a perfectly made integrator.

This results from the fact that both the amplification factor of an amplitude modulation amplifier and the time delay introduced by the amplifier are not time-constant magnitudes and, moreover, they are different for frequency components of a combined low-frequency modulating signal (see Documents CCIR, period 1963—1966, Doc X/58 of Mar. 24, 1965). Another cause is that the time delay introduced by the preamplifier of a transmitter high-frequency channel is also subject to time variation due, for example, to supply voltage fluctuations or aging of electron tubes in such amplifier.

Other classes of systems intended for the generation of single-sideband signals which satisfy the condition of compatibility with a linear envelope detector are also not free from the failings mentioned above.

Also systems, in which carrier-wave phase modulation approximate to the desired relation is developed indirectly by nonlinear conversions of a conventional single-sideband signal (see U.S. Pat. No. 3,212,008; Polish Pats. of N. V. Philips kl $21a^4$, 14/01 Nos. 50,456; 51,485; 53,741), provide the suppression of unwanted sidebands in a manner which is very much dependent upon the parameters of an amplitude-modulator amplifier and of a preamplifier in the high-frequency channel of the transmitting appliance.

Insufficient suppression of the unwanted sideband also results in the system in which an additional suppression of the sideband is achieved by using a feedback loop (German Pat. No. 1,088,114). It is, with respect thereto, a very complicated problem to ensure the negative nature to the feedback loop throughout the band of the frequencies modulating a broadcast transmitter because a selective filter for the unwanted sideband is included in the feedback circuit. This introduces an additional and considerable phase shift to the signal, which results in reduction of the sideband suppression and instability of the operation.

An object of the invention is to eliminate the undersirable influence of the amplitude-modulator amplifier used in known compatible single-sideband systems with amplitude-modulated carrier waves (which systems are described by S. I. Tetelbaum and G. Grinevich in the publication "Experimental Study of the Method of Optimum Amplitude-phase Modulation", Radio Engineering 12 (1957) No. 5, p. 42—47) upon the suppression ratio of the unwanted sideband in transmitter output.

According to the invention, an audiofrequency signal to be transmitted is fed to the input of an integrator from the output of an amplitude-modulator amplifier, in a transmitter, and not from a modulation line directly as in the case in known systems, the output terminals of the said amplitude-modulator amplifier being, at the same time, connected to a delay member the output of which is applied to the low-frequency input terminals of a modulated stage.

The reduction of the influence of the instability in the time delay, introduced by a preamplifier into a phase-modulated signal, upon the suppression ratio of the unwanted sideband in a transmitter systems according to the present invention is accomplished by inserting an automatically controlled delay circuit between the output terminals of the phase modulator and the input terminals of the preamplifier.

In comparison with known systems used to suppress unwanted sidebands in amplitude-modulated transmitters employing an additional phase modulation of a carrier wave obtained directly as illustrated in FIG. 1 or indirectly, the system according to the invention yields considerable technical advantages consisting in the possibility of using in that system the simple amplitude modulators employed in conventional double-sideband transmitters, without any need to equalize the attenuation- and group-transit-time characteristics of the modulators.

The system of the invention makes, to a great extent, the ratio of sideband suppression independent of the time instability of main transmission parameters of both the high-frequency preamplifier and the amplitude modulator in the transmitter.

The invention will now be described by way of example with reference to FIG. 2 which shows a block diagram of a system for suppressing one sideband of an amplitude-modulated transmitter according to the in which the elimination of the influence of nonuniformity in the attenuation characteristic and group-transit-time characteristic of an audiofrequency amplifier 20 as well as the influence of any time instability of the said characteristics upon the suppression ratio is accomplished by applying a low-frequency modulation signal to an integrator circuit 22 from the output terminals of the said amplitude modulator through a compensated voltage divider 24.

A delay circuit $\tau$ is inserted between the output of amplifier 20 and an amplitude amplifier 26 to compensate for time delay developed in integrator 22, voltage divider 24 and a preamplifier in the high-frequency channel of the transmitter.

It is evident that in such circuit arrangement, the amplifier 20 is connected before the circuit point in which the low-frequency signal is separated and fed to the channels of amplitude modulation and of phase modulation of the carrier wave. As known from the above-described principle of generating compatible single-sideband signals, any amplifier of any amplitude-phase response and any phase-frequency response, when inserted before the point of signal separation into two channels—that of amplitude modulation and that of phase modulation, will not at all effect the process of shaping a single sideband signal. As a result, it will have no bearing on the suppression ratio of the unwanted sideband in the transmitter output.

The influence of instability, in the time delay introduced by the preamplifier into the high-frequency channel of a transmitter, upon the suppression ratio is greatly reduced by using an automatic delay control circuit AR$\tau$ in the high-frequency channel of the transmitter system according to the invention.

The AR$\tau$ circuit comprises: a time delay regulator $\tau_{VAR}$ inserted between the output of a phase modulator 28 and the input of a preamplifier 30 of the first stage, a standard delay line $\tau_S$, a compensated voltage divider 32, and a comparator 34.

Phase-modulated signals are fed to the input terminals A of the comparator member 34 from the output of phase modulator 28 through delay line $\tau_S$ of standard delay value, while the input terminals B of the comparator 34 are fed by the phase-modulated signals taken from the output terminals of stage 26 through compensated voltage divider 32.

The comparator comprises two radiofrequency phase detectors, their output signals being compared to each other with respect to the phase in an equalized audiofrequency synchronized detector, said detector having an output signal $Ur$ proportional to the difference between the modulated waves of audiofrequency signals.

The comparator output signal $Ur$, the value of which depends on the difference between the time delays of signals fed to the comparator input terminals, is used to control the value of time delay introduced to the transmitter high-frequency channel by the regulator $\tau_{VAR}$.

For proper circuit operation, the time delay of the standard delay line should be equal to the total $\tau_{wsr}$ of signal delays introduced by: the regulator $\tau_{VAR}$ at $Ur=0$, the voltage divider 32 and the preamplifier 30 of the transmitter high-frequency channel under its average operating conditions; the delay control range $\Delta\tau$ of the regulator $\tau_{VAR}$ should not be lower than the delay variation range $\Delta\tau_{W}$ of the transmitter high-frequency preamplifier.

In the above circuit, the system of FIG. 2 comprises two amplifiers:

1. An audiofrequency amplifier indicated at 20 in FIG. 2, and

2. A radiofrequency amplifier indicated at 30 and constituting a preamplifier in the high-frequency channel.

Delay member $\tau_o$ compensates a signal time lag caused by the integrator and a part of the high-frequency channel enclosed between the output of the phase modulator 28 and the input of the amplitude amplifier 26 in which a modulation of the previously phase-modulated carrier wave is effected. Said part of the high-frequency channel comprises a preamplifier of the channel and a variable delay $\tau_{VAR}$.

The total time lag in said part of the channel, due to the providing of the time dealy automatic control system remains practically constant, since possible changes of the time lag preamplifier 30 are compensated by delay changes of reverse sign effected by the variable delay member $\tau_{VAR}$.

In order to further explain the circuit of the invention, there are shown in FIGS. 3, 4, and 5, exemplary components of the above-mentioned arrangement. FIG. 3 more particularly shows a comparator; FIG. 4 whows a variable delay, and FIG. 5 shows an integrator.

Furthermore, in FIG. 6 is shown the shape of the integrator output signal at different modulation percentages of the transmitter in the case of a transmitted signal of the sinusoid type having a pulsation $p$. FIG. 6 shows a signal spectrum being generated in such case at the transmitter output.

The comparator of FIG. 3 comprises two radiofrequency phase detectors 37 and 39 affecting a demodulation of the phase-modulated carrier wave fed to the both comparator inputs A and B. In the case of transmitter modulation with a single sinusoidal signal, input signals of detectors 37 and 39 are fed to the audiofrequency phase detector 38 in which phases of both signals are compared. Because, according to the Nyquist's principle of time delay measurements for signals of high-frequency, such delay takes the form of a low-frequency signal phase change, such signal being transmitted by taking advantage of a high-frequency signal. The input signal of the equalized phase detector 38 is used to control the value of the time lag affected by the variable delay $\tau_{VAR}$.

In order for the comparator to be responsive only to slow changes of the delay of the transmitter high-frequency preamplifier, the detector 38 should have a high time constant or should be provided with a low-pass filter having a low limit frequency value.

In order to make the operation of detectors 37 and 39 independent of possible changes of the input voltage amplitude, amplitude limiters 36 and 40 are placed before such detectors.

The voltage necessary for operation of synchronized phase detectors 37 and 39 is applied thereto from the carrier generator. Said voltage is applied through a phase shifter 41 which compensates a phase shift of the carrier wave signal being coupled from one side through a calibration delay line and from the other side through a loop comprising a controlled time lag device, a high-frequency line preamplifier and a compensated voltage divider.

The controlled time lag element of FIG. 4 may be based on the system disclosed in the P. E. Drapkin's U.S. Pat. No. 3,260,968 entitled "Variable Delay Network Utilizing Voltage VAriable Capacitors." Said system consists of an artificial delay line in which capacitors of a capacitance depending upon the applied voltage are used.

The voltage applied is equal to the voltage sum of the source 46 establishing an initial capacitance value of the delay line capacitors 48 and a control voltage $Ur$. Said voltage is applied to the capacitors 48 through an inductance member 45 and a resistor 44, which constitute a high-frequency filter.

FIG. 6 illustrates the output voltage of the integrator 22 of FIG. 2 at different modulation percentages in the case of transmitter modulation with a single sinusoid signal having a pulsation $p$.

FIG. 7 illustrates a high frequency signal spectrum at the output of the amplitude amplifier 26 of FIG. 2.

The integrator used in the system of FIG. 2 may be based on the system disclosed in the K. H. Powers U.S. Pat. No. 3,050,700. Said system is shown in FIG. 5.

An essential element of the system is a wideband 90° phase filter indicated in FIG. 5 at 72. The filter performs an operation called the "Hilbert's Transformation." Said transformation consists of phase shifting all spectral components of the signal led to the input of such system by 90° under conditions of unchanged component amplitudes.

Such filter consists of a tapped delay line comprising 2N–1 delay units. Each of such units affects a signal delay of 1/W sec. where W is the band width of the low-band signal led to the input of said line. The line is closed at its end by a characteristic impedance 55.

All signal received from taps arranged on both sides of the branch 69 constituting the center of the line are led through attenuators 56—61 to two adders 62 and 64. A phase inverter 63 serves to shift the phase of components received from taps located on the left of the central branch.

The suppression effected by attenuators in the number of $2n-1$ /$n$=1,2,3,4,..., $n$/ according to the above-mentioned U.S. Pat. No. 3,050,700 should be $$K_{2n-1}=\frac{2}{/2n-1/\pi}$$

At such suppression ratio of the individual attenuators, it is impossible, even when using a considerable number of attenuators, to avoid a pulsation of the suppression characteristic of the circuit enclosed between terminals 69 and 70. Such pulsation occurs due to the Gibbs phenomenon.

Research made recently and described by W. Schneider in Telefunken Zeitung, part 1/2, 1967, page 107—112 indicates that such pulsations may be avoided by the introduction of exponential convergence multipliers $\mu_{2n\text{-}1}$ defined by equation 26 in said publication. In the wideband 90° phase filter system described in the above-mentioned publication, a suppression effected by the attenuator indicated as $2n$-1 should be equal $K_{2n-1}\mu_{2n-1}$ but not $K_{2n-1}$ as it would be according to K. H. Powers.

The systems indicated at 65, 66 and 67 in FIG. 5 are intended to obtain from the transmitted signal $t$ another nonnegative signal $U$ ($t$) controlling a nonlinear quadripole 67 which effects the logarithmic operation. Said quadripole may be constructed on the basis of a germanium diode having a logarithmic characteristic or as on operator amplifier comprising in its feedback loop a diode having an exponential characteristic. A diode of the Mullard Type SCL b63 0 for example, has such characteristic.

I claim:

1. A transmitter circuit comprising an audiofrequency amplifier adapted to receive a signal to be transmitted, an amplitude amplifier, first delay means coupling said audiofrequency amplifier to said amplitude amplifier, an integrator circuit coupled to the output of said audiofrequency amplifier, a phase modulator coupled to the output of said integrator and controlled thereby to modulate a carrier, a preamplifier, and control means including a variable delay means coupling the output of said phase modulator to said preamplifier, said preamplifier being coupled to said amplitude amplifier whereby the said amplitude amplifier modulates the phase-modulated carrier with the signal received from said audiofrequency amplifier, said first delay means compensating at least for the delay in said integrator circuit, said control means with said variable delays caused by said preamplifier.

2. A circuit as claimed in claim 1 comprising a compensated voltage divider coupling said audiofrequency amplifier to said integrator circuit, said first delay means also compensating for delays in the voltage divider.

3. A circuit as claimed in claim 2 wherein said control means further includes a delay comparator coupled to the outputs of said phase modulator and preamplifier and generating a comparison signal to control said variable delay means.

4. A circuit as claimed in claim 3 wherein said control means includes a delay line coupling the comparator to said output of said phase modulator and a compensated voltage divider coupling the comparator to said output of said preamplifier.

5. A circuit as claimed in claim 4 wherein said delay line has a delay equal to the combined delay of the variable delay means and preamplifier under average operating conditions.

6. A circuit as claimed in claim 4 wherein said variable delay means has a delay range at least equal to that of said preamplifier.